No. 858,809. PATENTED JULY 2, 1907.
J. W. HAMMETT.
POTATO DIGGER.
APPLICATION FILED NOV. 22, 1906.
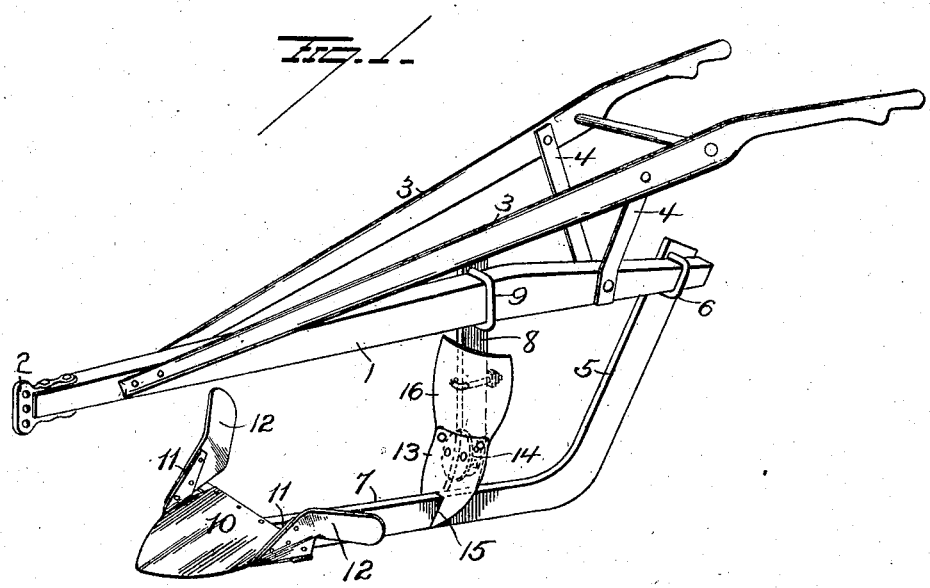
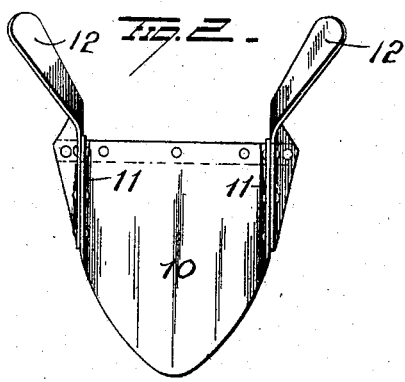
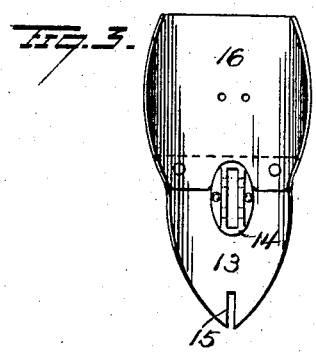
WITNESSES
INVENTOR

UNITED STATES PATENT OFFICE.

JAMES W. HAMMETT, OF EUREKA, WEST VIRGINIA.

POTATO-DIGGER.

No. 858,809.　　　　Specification of Letters Patent.　　　　Patented July 2, 1907.

Application filed November 22, 1906. Serial No. 344,587.

*To all whom it may concern:*

Be it known that I, JAMES W. HAMMETT, a resident of Eureka, in the county of Pleasants and State of West Virginia, have invented certain new and useful Improvements in Potato-Diggers; and I do hereby declare the following to be a full, clear, and exact description of the invention, such as will enable others skilled in the art to which it appertains to make and use the same.

My invention relates to improvements in potato diggers, the object of the invention being to provide an improved structure supporting two shovel plows of improved construction, in alignment, one behind the other, to remove the potatoes from the ground, free them from excessive dirt and leave them in convenient position at the side of the furrow, to be picked up.

With these and other objects in view, the invention consists in certain novel features of construction and combinations and arrangements of parts as will be more fully hereinafter described and pointed out in the claims.

In the accompanying drawings, Figure 1 is a perspective view illustrating my improvements and Figs. 2 and 3 are detail views of the plows.

1 represents a plow beam, preferably of wood, having a suitable clevis 2 at its forward end.

3, 3, represent handles secured to the beam 1 and strengthened by braces 4, and the rear ends of these handles, are made with pistol grip hand-holds, which are very desirable in managing the draft animals.

5 represents a standard, secured to the rear end of the beam 1, preferably by a heavy stirrup 6. The lower end of the standard is bent and extended forwardly, approximately parallel with the beam, to form a forwardly projecting bar or stem 7. A second standard 8 is also secured to beam 1 by a stirrup 9, and secured at its lower end, to stem 7, in any desired manner.

At the forward end of stem 7, my improved plow 10 is secured at an angle, preferably of about twenty degrees, and comprises a plate with a rounded lower cutting edge, to cut under the potatoes and compel them to travel up and over the plow. Each side of the plate, at its upper end, is provided with upwardly projecting cutters 11, and moldboards 12 are secured to these cutters 11. The moldboards are bent, as shown, and flare outward, to turn a portion of the dirt at both sides of the furrow, and make a wide and smooth surface to receive the potatoes, when they are forced out of the furrow, by the rear plow 13, as will more fully hereinafter appear.

The rear plow 1, 3, which is secured to the forward edge of standard 8, by means of a bifurcated bracket 14, has a slot or notch 15 in its lower edge to receive the stem 7 so that the plow 13 will extend to the lower edge of the latter, and flare an equal distance at both sides thereof. A rounded or bulged deflector plate 16 is secured to the upper edge of plow 13 and to standard 8, and constitutes a continuation of the deflecting surface to throw the potatoes out of the furrow.

The operation of my improvements is as follows:— The front plow 10 cuts under the potatoes and compels them to move up over the plow and fall into the furrow formed thereby. The cutters 11 control the width of the furrow and the moldboards evenly spread the dirt at both sides of the furrow. The rear plow 13 strikes the potatoes, in the furrow, and deflects them to both sides, and in so doing frees the potatoes of a great part of the dirt adhering thereto and deposits the potatoes in easy position for gathering.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In a potato digger, the combination with a beam and a forwardly projecting stem secured thereto, of a shovel plow at the forward end of the stem, and a second plow back of the first and constructed to deflect the potatoes to the sides of the furrow.

2. In a potato digger, the combination with a beam, a forwardly projecting stem secured thereto, and a standard connecting the beam and stem, of a shovel plow secured to the forward end of the stem, a second plow secured to the standard and having a notch in its lower end to receive the stem and locate the plow at both sides of the stem.

3. In a potato digger, the combination with a beam, handles secured thereto, and braces connecting the handles and beam, of two standards secured to the beam, a stem connected to the lower end of both standards and extending in advance of both and approximately parallel with the beam, a shovel plow at the forward end of the stem, and a shovel plow secured to one of the standards and located in alinement with the first-mentioned plow.

4. In a potato digger, the combination with a frame, of a plow at the forward end thereof comprising an inclined plate having rounded cutting lower edge, cutters at the upper edge of the plate at both sides thereof, moldboards secured back of the cutters, and a plow secured to the frame in rear of the first-mentioned plow.

In testimony whereof, I have signed this specification in the presence of two subscribing witnesses.

JAMES W. HAMMETT.

Witnesses:
　LENNA BRADLEY,
　ROSS WELLS.